US006282711B1

(12) United States Patent
Halpern et al.

(10) Patent No.: US 6,282,711 B1
(45) Date of Patent: Aug. 28, 2001

(54) METHOD FOR MORE EFFICIENTLY INSTALLING SOFTWARE COMPONENTS FROM A REMOTE SERVER SOURCE

(75) Inventors: Joseph E. Halpern; David A. Martz; James Sangroniz, all of Boise; Walter J. Scheiderich, III, Meridian, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/372,400

(22) Filed: Aug. 10, 1999

(51) Int. Cl.$^7$ ...................................................... G06F 9/445
(52) U.S. Cl. ............................................. 717/11; 709/203
(58) Field of Search ............ 717/1–3, 11; 709/216–227, 709/203; 713/1, 2, 100

(56) References Cited

U.S. PATENT DOCUMENTS

| | | | |
|---|---|---|---|
| 5,845,077 | * 12/1998 | Fawcett ................................ | 709/221 |
| 5,860,012 | * 1/1999 | Luu ...................................... | 395/712 |
| 5,931,909 | * 8/1999 | Taylor .................................. | 709/221 |
| 5,933,647 | * 8/1999 | Aronberg et al. ...................... | 717/11 |
| 5,950,010 | * 9/1999 | Hesse et al. ........................... | 717/11 |
| 6,018,627 | * 1/2000 | Iyengar et al. ......................... | 717/1 |
| 6,051,032 | * 4/2000 | Harrison et al. ........................ | 717/11 |
| 6,080,207 | * 6/2000 | Kroening et al. ....................... | 717/11 |
| 6,189,138 | * 2/2001 | Fowlow et al. ......................... | 717/1 |
| 6,223,345 | * 4/2001 | Jones et al. ............................ | 717/11 |
| 6,247,128 | * 6/2001 | Fisher et al. .......................... | 713/100 |

OTHER PUBLICATIONS

Kelly, "Gain control of application setup and maintenance with the new Windows Installer", Microsoft Systems Journal, Sep. 1998, pp. 15–27.*

Faden, "Intel adds new function to LanDesk desktop tools", Open Systems Today, Feb. 1995, pp 34.*

Avry, "SaberTools SMS adds small value to Microsoft SMS", InfoWorld, Dec. 1996, pp 41.*

* cited by examiner

Primary Examiner—Kakali Chaki

(57) ABSTRACT

This invention includes a method for more efficiently installing a subset of software components and data files contained in a component pool in a distributed processing network such as the Internet. An installation package delivered to a requesting end user is custom configured at a remote server location prior to delivery to a client system operated by the user, in response to the user's inputs. The delivered installation package contains only the programs, data, and local installation tools required for the user's unique installation requirements. The user initiates the installation process by connecting to the remote server system via a telecommunications link within a distributed processing network, such as the Internet. Engaging in a dialog with the server which provides informational links to server-side databases, the user chooses all software components and options that he desires his software package to have. Such a package may be, for example, a subset of a software suite. After selection of all options, a single package is manufactured on the server. A single download then occurs of a single file. This is no bigger or smaller than what is absolutely required by the components and options selected. Upon receipt of the downloaded file, the user executes the file to unpack the installation directory. An auto-start feature can also be included which immediately launches the installation of the selected applications and options.

21 Claims, 3 Drawing Sheets

METHOD FOR MORE EFFICIENTLY INSTALLING SOFTWARE COMPONENTS FROM A REMOTE SERVER SOURCE

This application is related to co-pending applications Ser. No. 09/191,262 entitled, "MANUFACTURE OF SOFTWARE DISTRIBUTION MEDIA PACKAGES FROM COMPONENTS RESIDENT ON A REMOTE SERVER SOURCE", and U.S. Ser. No. 09/191,257 entitled, "SOFTWARE INSTALLATION USING ABSTRACT DATA", both applications filed on Nov. 12, 1998.

FIELD OF THE INVENTION

This invention relates to methods used to customize the installation of software packages, as well as the installation of selected components of a software suite, on a local data processing system by downloading files from a remote server source coupled to a distributed processing network such as the Internet.

BACKGROUND OF THE INVENTION

The process of installing software retrieved from a remote server system accessible via the Internet is generally clumsy, inefficient, and difficult. When a user desires to install selected components or programs of a particular software package available from a remote server source, he typically must download an entire installation package, either as a single large compressed file, or as multiple floppy disk "images". Most likely, the installation package includes not only those components and options that the user will ultimately install on his target machine, but may components and options which will be discarded. The user must then "unpack" the compressed file into a multitude of smaller files, which may include an installer program and uninstalled program files. This process often involves double-clicking on a self-extracting executable which contains batch commands for PKUNZIP or a similar decompression utility, and automatic startup for the installer program. In certain instances, the user must manually execute the individual decompression and install steps. The installer program, which is typically unpacked into an identified file directory, is normally named either "setup.exe" or "install.exe".

The standard installation process heretofore described is highly efficient if all of the components within the downloaded installation package are installed on the target system. However, efficiency is directly related to the percentage of delivered components actually installed on the target system. If only one of many delivered components is installed, then the standard installation process is highly inefficient. Consider the case of an application suite. A suite may be generally characterized as a set of related applications (components), each component often having many installation options, which may include selectable features and data templates. It is not unusual for multiple applications to require access to shared files stored in a common directory. If the entire suite is downloaded as a single installation package, but only some of the downloaded applications are subsequently installed on the target client system, a great deal of the transmitted data is wasted. Likewise, if individual components of a software suite are downloaded, the download may be based on a static installation package for each component. In such a case, common files (i.e., those files shared by different components of a software suite) are often transmitted redundantly with the static installation package for each component. Transmittal of more than one copy of common files to the user wastes network bandwidth and increases download and installation times. In addition, any options associated with each component that are not implemented by the user also represents waste. Where static installation packages are employed for individual software components, each static package must be tested for functionality with each software update.

Inefficiency in software package transmission heretofore described arises primarily because integration of the components into the target environment is done on the client machine, after the data has already been transmitted and unpacked. There is generally little that can be done to prune away unwanted and redundant files and data prior to downloading a large software package. This inefficiency is so onerous, particularly in dial-up Internet environments, that users may simply choose not to acquire a non-trivial application package using that medium. What is needed is a new method of software distribution that eliminates the requirement that unwanted and/or redundant data be transmitted to a client machine if only a portion of the available software components are to be installed thereon.

A slightly different approach to software installation is taken for intra-company networks. Installation programs have been developed specifically for that use. Typically, such a program is installed by a network administrator as an application on a shared disk drive. The network install program can generally be launched from any client machine on the network, but almost always will run under only one particular operating system. For instance, an installer for Windows NT can be stored on a Unix file system, but it must be launched on a client machine which has Windows NT loaded on Intel-compatible hardware before any installation options may be selected. Operation of traditional network installer programs is limited to a common subnet. They must therefore be installed on a shared drive inside the user Internet firewall. This means that network installation cannot generally be accomplished directly between the networks of two different companies. Network installation packages generally provide every option for every type of installation that one may wish to perform on the enterprise network. The installation package therefore contains a full set of application components and options although some of those applications and/or options are rarely, if ever, used. Whenever a new version of the software is released by the vendor, the network administrator must reinstall the installer program on the network.

One current approach to downloading software from the Internet requires the installation of an application program on a client or server machine of a local network. Once installation is complete, the program facilitates downloads from compatible web sites. An example of such a program is "Fresh Bits" from the company InstallShield. The program, which can be loaded from a CDROM or from the Internet, does not run in a web browser. Thus, it could not be operated from a browser such as Netscape running under a Unix-type operating system. With "Fresh Bits", the custom configuration of a downloaded software package or suite occurs at the client level. Thus, when a user wants to install only a subset of a particular software package or suite, much unneeded and redundant data must be transmitted over the Internet to the client machine.

What is needed is a new method for installing software from a distributed processing network such as the Internet which will allow the installation of a subset of a suite without having to download unnecessary components and data.

SUMMARY OF THE INVENTION

This invention includes a method for more efficiently installing a subset of a pool of software components in a distributed processing network such as the Internet. An installation package delivered to a requesting user is custom configured at a remote server location prior to delivery to the user, in response to the user's inputs. The delivered installation package contains only the programs, data, and local installation tools required for the user's unique installation requirements.

The user initiates the installation process by connecting to the remote server system via a distributed processing network, such as the Internet. Connection is established to a user interface (UI) template resident on the server. The UI template may be selected from several available templates, each of which is designed for a specific type of user (e.g., a regular user, a power user, or a system administrator). The UI templates can be implemented using one of many available standard graphical interface technologies.

Via the UI template, the user engages in a dialog with an options manager, a server-resident program which manages selection of components from a component pool. The options manager may access "meta data" from a component information database. Meta data is information which relates to the interdependency of components. If the user desires information related to a particular software component within the component pool, such information may also be contained within the component information database, or the options manager may provide informational links to server-side databases. Such links can be visible to or programmatic and hidden from the user. The options manager may also request information about the contents or the state of the component pool by accessing the component pool itself via an installer set generator (see description below). The options manager may also initiate a call back to the client environment or to the local network environment of the client so that a discovery client agent program may gather additional information for the options manager that may be useful in guiding a presentation of component selections to the user. The user then chooses all software components and options that he desires his software package to have.

Once the user has selected the components and options that interest him/her, the options manager delivers an installation and/or options specification to the installer set generator. The installer set generator accesses the component pool and dynamically produces a customized set of files required for the selected components and options. Many preliminary software installation tasks, which heretofore would have been performed at the client level are performed at the server level, prior to sending anything other than options and, if requested, product information to the client via the UI template. It is far more efficient to perform these tasks at a remote location where a full complement of program files, data files and installation files reside, rather than transferring the same files and data via a telecommunications link to a client system and having the preliminary installation tasks performed there. The big payoff of the invention is that extraneous program files, installation files and data files are not transmitted to the user. For prior art installation processes over a distributed processing network such as the Internet, the extraneous files, along with the needed files, are downloaded to the user and later discarded. As will be hereinafter explained, additional advantages accrue as a result.

After the installer set generator engine completes its assigned tasks, a packager, in conjunction with a compression process and a self extractor process, bundles up a custom installation package into one or more packages for transmission to the client. This package may be a single, compressed, self-extracting executable, or it may constitute a number of packets transmittable via a packetization transport protocol established between the packager and either the UI template or a client agent program which has been downloaded from the server and is running on the client machine. The advantages of using a transport protocol are that individual packets can be retransmitted if lost or damaged, and the download can be restarted or continued, if interrupted, without the need to retransmit packets already received by the client machine. For a self-extracting executable containing decompression and auto-start utilities, the user simply executes the received setup.exe or install.exe file. This executable may also include a client installer program, which may be merely a cloned copy of the installer set generator program. The client installer program may be configured to permit further user interaction, or if selections have already been made at the server level, may just install the contents of the package without further user intervention.

The primary advantages of the new software installation process are: it permits a user to obtain the software he wants without having to download extraneous program files; it permits users to learn about the functionality of individual software components and to select desired software components without having to download unnecessary code and/or data, or an installer agent program; and it allows a software vender to supply packages smaller than an entire application suite, thereby increasing demand for its products because the user pays only for what he orders and uses, and providing the vender with more accurate information with regard to which software components are actually being used.

DETAILED DESCRIPTION OF THE INVENTION

In order for a client system user to more efficiently install a subset of a pool of software components downloaded from a remote server system coupled to a distributed processing network such as the Internet, an installation package is custom configured at the server location so that it contains only the components and options requested by the user during a dialog with the server. In order to further reduce the amount of downloaded material, the installation tools are also pared down to only those needed for the installation of the ordered components and options.

Figure 1:
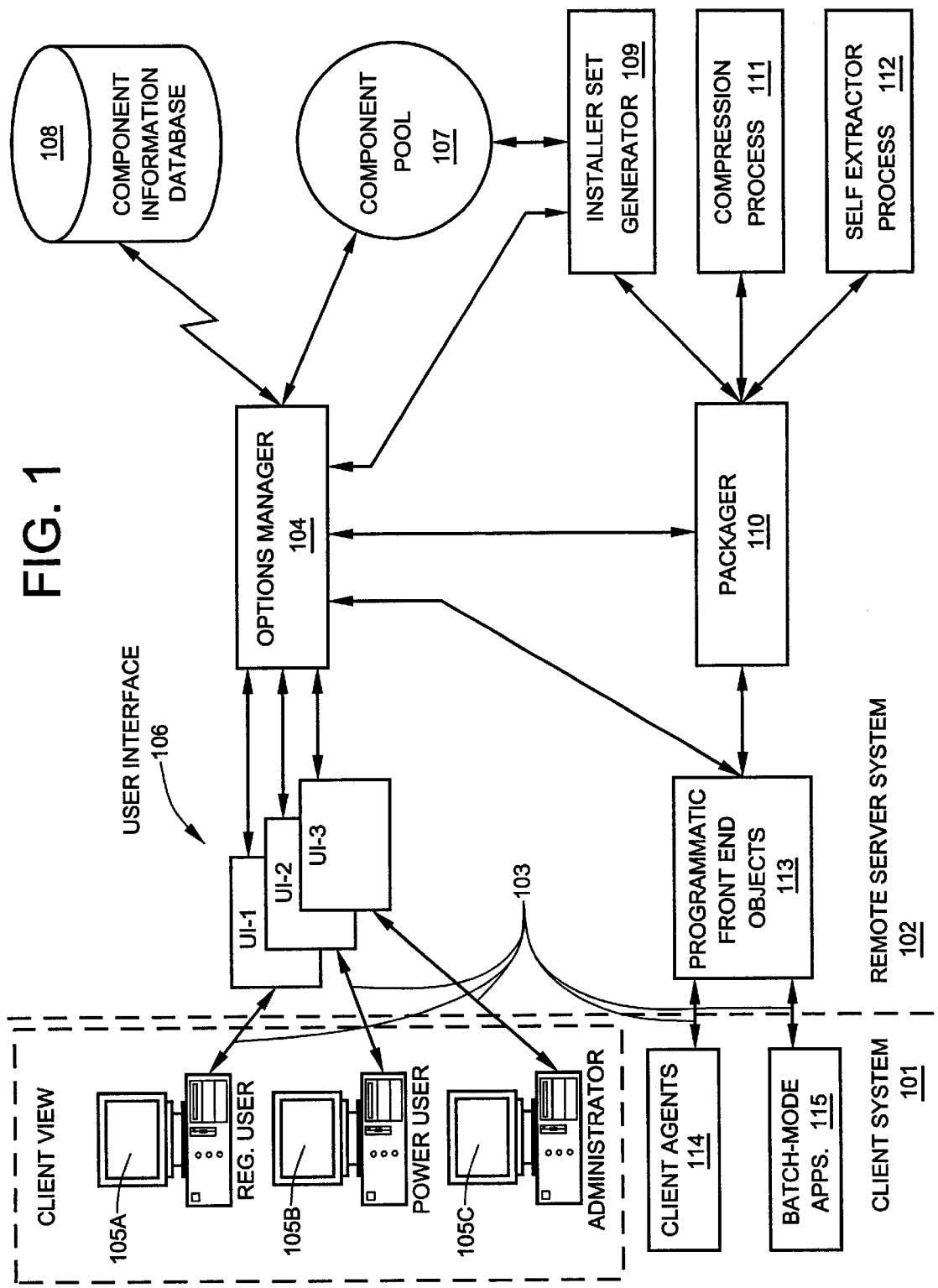
FIG. 1 is a block diagram of the installation framework for the new software installation process for distributed processing networks.

Referring now to FIG. 1, the installation process requires connection between a client system 101 and a remote server system 102 via a distributed processing network such as the Internet. A user initiates the installation process by establishing a telecommunications connection 103 to an options manager 104 via a user interface 106. The user interface 106 can be customized to fit the needs and sophistication of particular users. As an exemplary implementation, multiple user interface templates UI-1, UI-2 and UI-3 provide a remote, programmatically accessible framework for delivering a variety of customized UIs to regular users 105A, power users 105B and system administrators 105C, respectively. The user interface 106 can be implemented using one of many available standard graphical interface technologies, such as the X Window System for the Linux operating system, or one of the Internet technologies such as html, javascript, standard web browsers (e.g., Netscape Navigator or Internet Explorer), and javaserver applications on a remote server.

Via the user interface 106, the user 105 engages in a dialog with the options manager 104, a server-resident program which manages selection of components from a component pool 107. The options manager 104 may access "meta data" from a component information database 108. Meta data is information which relates to the interdependency of components. If the user desires information related to a particular software component within the component pool 107, such information may be contained within the component information database 108, or the options manager may provide informational links to other server-side databases (not shown). Such links can be visible to and selectable by the user, or programmatic and hidden from the user. The options manager 104 may also obtain information about the contents or state of the component pool 107 by accessing it directly. If two separate storage entities (e.g., the component pool 107 and the component information database 108) contain information about the same software components, integrity between the entities can be maintained either synchronously or asynchronously, depending on the implementation. The options manager 104 may also initiate a call back to the client environment or to the local network environment of the client so that a client agent 114 (in this case a discovery client agent), possibly downloaded from the server 102, may gather other installation-related information for the options manager 104, which may be useful in guiding a presentation of component selections to the user. The discovery client agent 114 interfaces with the options manager 104 via a programmatic front-end object 113. The front-end objects 113, which may be written in Java script, provide for an efficient, optimized interface which "front-ends" the entity being accessed. Examples of useful information may include a list of software components already installed in the client environment and the release version of those components and detected or suspected devices, such as printers, coupled to the client environment which may necessitate certain software installation modifications. The options manager 104 sends data back to the selected user interface template UI-1, UI-2 or UI-3 for presentation to the user. The user then selects the components and options that interest him/her. As an example of option selection, it may be desirable for a European user to want a printer driver pre-configured so that it defaults to A4-size paper, rather than the standard U.S. default size of 8½×11.

In response to the user's selections, the options manager 104 delivers an installation and/or options specification to an installer set generator 109. The installer set generator 109 accesses the component pool 107 and dynamically produces a customized, non-binding set of files required for the selected components and options on a mass storage device connected to the server system. Many preliminary software installation tasks, which heretofore would have been performed at the client level, are performed at the server location, prior to sending anything other than options and, if requested, product information to the client via the user interface template UI-1, UI-2 or UI-3. These preliminary tasks may be thought of as a pre-transmittal, component staging process. It is far more efficient to perform these tasks at the remote server location where all the necessary files and data already reside, rather than transferring those files and data via a telecommunications link to a client site and having the client system perform the preliminary installation tasks.

Upon receipt of the component and option selection information, the installer set generator 109 analyzes component and option dependencies, and dynamically generates a local, non-binding uninstalled file set containing the desired components and options. The uninstalled file set is then transferred to a packager 110, which processes the received files and bundles them with an appropriate version of a client installer program, which may also be retrieved from the component pool 107, to form a custom installation package. Alternatively, the client installer program may be a copy of the installer set generator 109. The custom installation package is submitted to a compression process 111, which converts the received package into a single compressed file. The packager 110 then submits the compressed file to a self extractor process 112, which appends an extraction program to the compressed file as an executable.

The executable prepared by the packager 110 is then transmitted over the web to the client system 101 as one or more packages. Although a self-extracting executable may be sent to the client system 101 as a single file, it may also be transmitted via a packetization transport protocol between the packager 110 and the client system 101. The advantages of using a packet transport protocol are that the package is shipped in chunks that can be retransmitted if lost or damaged, and the download can be restarted or continued if interrupted. The exact transport mechanism is insignificant. Regardless of the mechanism used, the end user will view it as a single, atomic operation.

A programmatic front-end object 113 may also be used to interface the packager 110 with a batch-mode application 115, such as a custom batch mode installer program, which would install application programs from the component pool 107 without any interaction between a user and the options manager 104. In such a case, the application 115 is written with a knowledge of the contents of the component pool 107 and of the interdependencies between program components. The application 115 may also be a routine, resident on the client system 101 or on a local-area network to which the client system is coupled, which routinely queries the server 102 for the existence of more up-to-date versions of hardware drivers. Such an application would interface with either the options manager 104 or the packager 110 via a programmatic front-end object 113.

The steps that the user must take to convert the received package into fully functioning, installed software are determined by the particular type of package and the transport mechanism. For a self-extracting executable which includes program and data files and a client installer program, as well as decompression and auto-start utilities, the user may simply execute the received setup.exe or install.exe file to immediately install the applications and options which he/she has selected. The client installer program may be merely a cloned copy of the installer set generator 109. The client installer program may be configured to permit the contents of the delivered package to be installed without further user intervention. Alternatively, the installer program may be configured to permit further user interaction during setup on the client system. The user may choose to unpack and install as part of the download process, or the package may be optionally enhanced with additional files, components, or options, and distributed to other various target locations, again as either a batch installation script, an interaction installation package, or even as a new, subset component pool. Installation by a local server system (not shown) may also update a local database used by a client agent 114, in order to provide feedback for the next iteration of the overall process.

Figure 2:
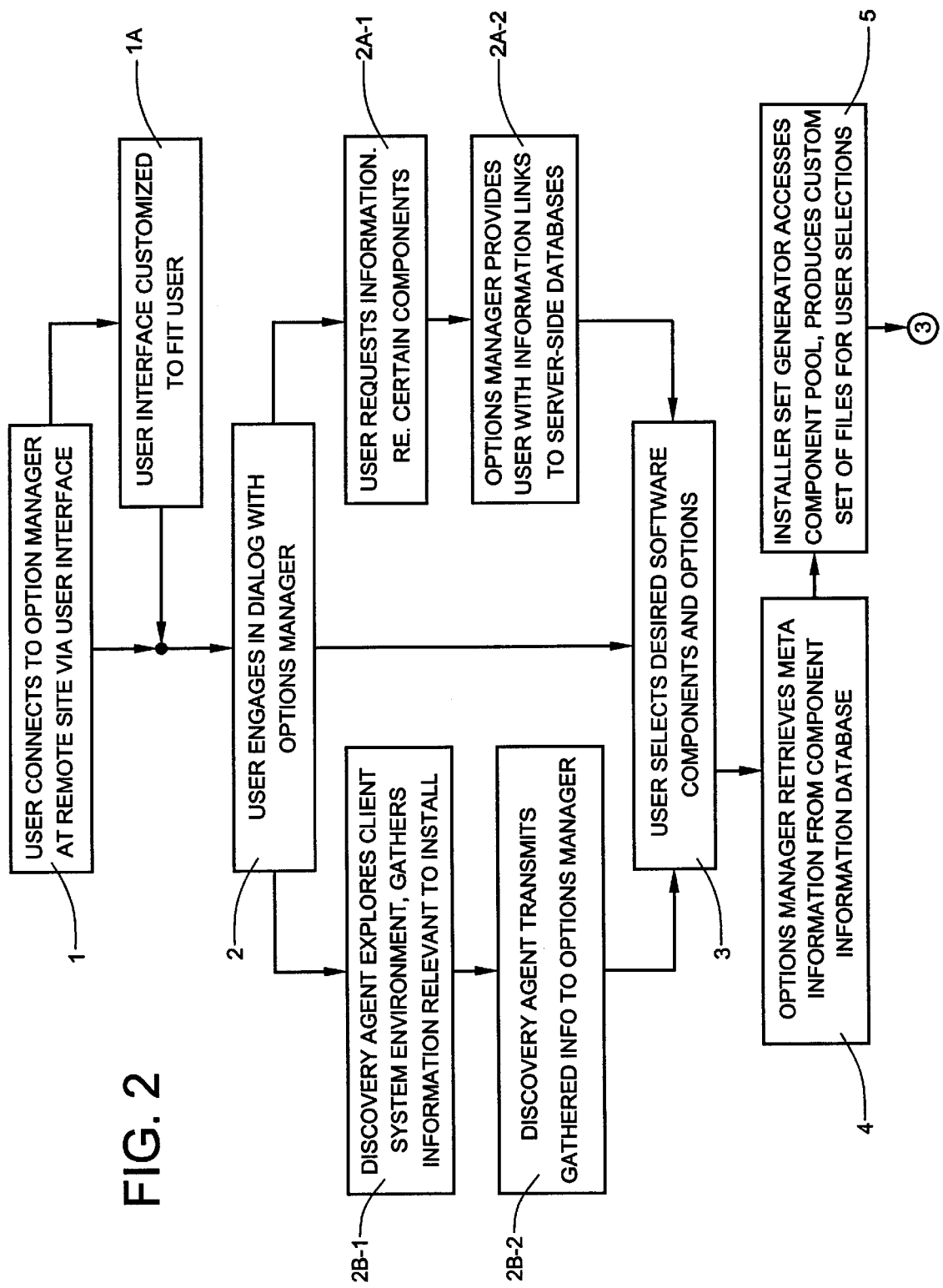
FIG. 2 is a block diagram showing a first portion of the process flow of the new software installation process.
Figure 3:
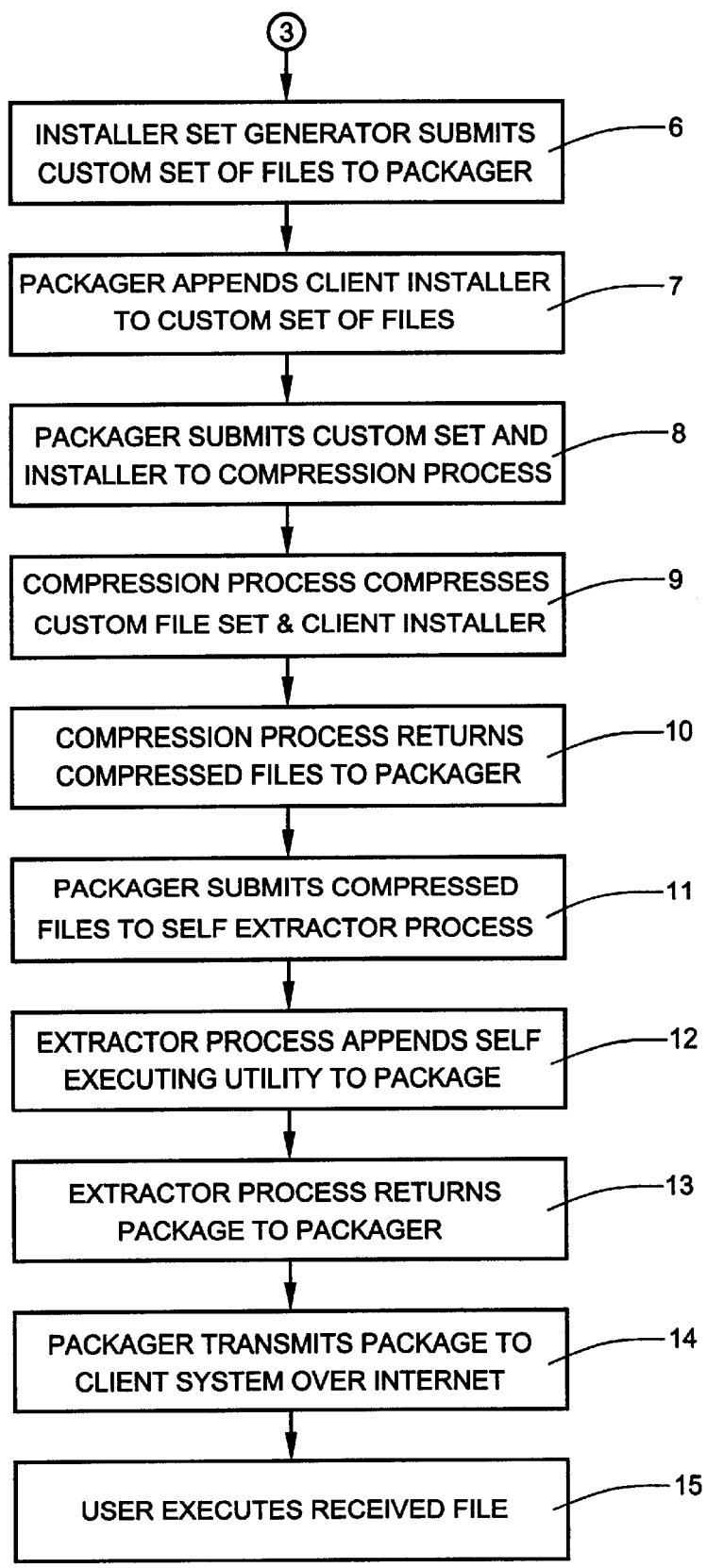
FIG. 3 is a block diagram showing a second portion of the process flow of the new software installation process.

The steps required to install a customized package configured at a remote site are shown in FIGS. 2A and 2B. Those steps are as follows:

Step 1: The user 105A, 105B or 105C (generally 105) connects to an options manager 104 through a user interface 106 resident on a server system (102) at a remote site via a telecommunications link 103;

Step 1A: The user interface 106 is optionally customized to fit the user 105;

Step 2: The user 105 engages in a dialog with the options manager 104;

Step 2A-1: The user 105 optionally requests information relating to various components;

Step 2A-2: The options manager 104 provides the user 105 with informational links to server-side databases;

Step 2B-1: A discovery client agent explores the client system environment and gathers information helpful to the options manager 104;

Step 2B-2: The discovery client transmits the gathered information to the options manager 104;

Step 3: The user selects desired software components and options from a list of components and options;

Step 4: The options manager 104 retrieves meta information from a component information database 108;

Step 5: The installer set generator 109 accesses the component pool 107 and produces a custom set of files corresponding to the user's selections;

Step 6: The installer set generator 109 submits the custom set of files to a packager 110;

Step 7: The packager 110 appends a client installer program to the custom set of files to create a custom installation package;

Step 8: The packager 110 submits the combined custom set of files and the appended client installer program to a compression process 111;

Step 9: The compression process 111 compresses the combined custom set of files and the client installer to create a compressed installation package;

Step 10: The compression process 111 returns the compressed installation package to the packager 110;

Step 11: The packager 110 submits the compressed installation package to a self-extractor process 112;

Step 12: The self-extractor process 112 appends a self executing extraction utility to the compressed installation package to create a self-executing file;

Step 13: The self-extractor process returns the self-executing file to the packager 110;

Step 14: The packager 110 transmits the self-executing file to the client system over the telecommunication link 103 as a single file or as multiple packets; and Step 15: The user 105 executes the received file and runs the client installer.

The technology required for the effective construction of customized software installation packages is described in a co-pending patent application entitled "MANUFACTURE OF SOFTWARE DISTRIBUTION MEDIA PACKAGES FROM COMPONENTS RESIDENT ON A REMOTE SERVER SOURCE", which was filed on Nov. 12, 1998 and accorded application Ser. No. 09/191,262. This application is incorporated herein by reference. This process disclosed in the pending application, hereinafter called "Portia", may be briefly described as a sequence of the following five steps:

1. Accessing the software developer's site on the Internet;
2. Selecting which software components the user desires to include in the new distribution media package (these components could be a subset of available components, and it they may include components which were unknown when the original package was manufactured);
3. For the software components which have been selected, comparing component files that reside on the original distribution media package with those that reside on the remote server, including the component installation data files;
4. Identifying a mass storage medium on which the new distribution package will be created (for medium types of limited storage space such as floppy diskettes, the files are organized according to floppy diskette numbers, with respect to the size of each file and the amount of free space on a diskette);
5. Copying required files to the new distribution medium (new files and updated versions of existing files are downloaded from the developer's Internet site, while still current files are copied from the original media package); and
6. Updating the installation data files, including the setup data files, to reference files from the new media package location.

If custom installation disk sets are required by the user, a portion of the Portia technology may be used in a batch mode on the server side of the process. The custom disk set is manufactured based on the selected installation and/or option specifications. The required files and data are then compressed, packaged, appended and transmitted to the user. Once the new distribution media package has been received, the user can run the included setup program in order to install some or all of the software components that were included in the custom disk set.

Here are some of the significant differences between the Internet installer of the present invention and the Portia technology. Portia is a more traditional client-based installation technology featuring a complete user interface, whereas the user interface of the Internet installer is delivered to the user entirely as remote web pages. In addition, whereas Portia allows the user to select the mass storage medium, the internet installer uses a predetermined mass storage location, such as the server's fixed disk drive, as the staging location. Furthermore, an original distribution package is always required by Portia; the Internet installer needs none. Thus, while the Portia technology provides a more traditionally-based method for refreshing an existing installation package, the Internet installer creates a desired package for the user from scratch.

The new distributed network software installation process has a number of readily discernable advantages over the prior art installation processes. Most significantly, it allows users to learn about the functionality of individual software components and to select desired software components without the time penalty associated with downloading unnecessary code and/or data, or an installer agent. It may also avoid a monetary penalty associated with the downloading of unnecessary program components for which the user is charged. Additionally, it facilitates the creation and distribution of customized distribution software packages for specific target environments. The invention, by eliminating the need for static installation packages for individual software components, greatly reduces the complexity and cost of maintaining and testing a web site from which software may be downloaded. The invention also simplifies software downloading and installation for the user. Current web sites typically require a user to forge through pages of screen displays filled with explanations and restrictions until he/she finds the "just-right" pre-manufactured program package. Using the scheme of the present invention, the user can start from one simple web link and select the operating system and package size like any other option in the installation. Software integration is improved via extensive external web links to installation information resources, thereby allowing the user to make more informed decisions and selections with regard to his own particular needs and computing environment. A further advantage of the new installation method is that it allows granular tracking of which software components and options are actually installed from the central server/dispensary, thereby providing the software provider with better marketing information regarding which components of software suites customers are actually using and in what manner. The users also benefit, as the software provider is now able to charge for only those application components which have been installed on the client machine. There no longer need be any charge for discarded components. Optionally, the vendor may choose to continue to charge users for the entire software bundle, but allow them to return to the web site later to install components which were earlier ignored.

Although only a single embodiment of the invention has been heretofore described, it will be obvious to those having ordinary skill in the art that changes and modifications may be made thereto without departing from the scope and the spirit of the invention as hereinafter claimed.

What is claimed is:

1. A process for installing, on a local client data processing system, a subset of a pool of software components and data files available on a server data processing system at a remote location in a distributed processing network, said process comprising the steps of:
   connecting to the remote server system via a telecommunications link;
   selecting specific components from said pool;
   accessing the component pool and producing a custom set of files at the server location, which include only those required to implement the selected components on the client system;
   subjecting said custom set to a packaging process which produces a custom installation package which includes a client installer program;
   transmitting the custom installation package to the client system.

2. The process of claim 1, which further comprises the step of providing a user interface through which connection is made between said client and server systems.

3. The process of claim 2, which further comprises the step of customizing said user interface to fit the needs of the user.

4. The process of claim 3, wherein the step of customizing includes the provision of multiple user interface templates, each of which may be selected by the user.

5. The process of claim 2, which further comprises the step of providing an options manager, which is accessed through said user interface, and which engages the user in a component selection dialog.

6. The process of claim 5, wherein said component selection dialog includes a presentation to the user of a list of installable software components and installation options and a selection by the user of those software components and installation options which he desires.

7. The process of claim 6, wherein component installation information is retrieved by the options manager from server-side databases.

8. The process of claim 6, wherein said component selection dialog includes a request initiated by the server system to couple a discovery agent directly to the client system environment, said discovery agent adapted to gather information regarding the client environment for use by the options manager.

9. The process of claim 1, which further comprises the step of providing an installer set generator, which accesses the component pool and produces said custom set of files.

10. The process of claim 9, wherein said packaging process includes a client installer appending process, a data compression process and an extractor process, said compression process compressing the custom file set and the client installer program, and said extractor process appending a self-executing extraction utility to the compressed file set and client installer program.

11. The process of claim 1, wherein said transmitting step is performed by sending said custom installation package to the client system as a single executable file.

12. The process of claim 1, wherein said transmitting step is performed by sending said custom installation package to the client system as a plurality of packets using a package transport protocol.

13. A software system for installing on a local client data processing system, a subset of software components and data files contained in a component pool on a server data processing system at a remote location in a distributed processing network, said system comprising:
   an options manager resident on the server system that manages selection of the subset of said components by a user operating the client system;
   a user interface via which communication between the client system and the options manager can be established;
   an installer set generator which, in response to instructions received from the options manager, accesses the component pool and produces a custom set of files required to install said subset of software components on the client system;
   a packager which produces a custom installation package containing said subset, and which includes a client installer program; and
   means for transmitting the custom installation package to the client system.

14. The software system of claim 13, wherein said user interface includes multiple templates, each of which is adapted for use a selected group of users.

15. The software system of claim 13, wherein said options manager initiates a dialog with the user and permits the user to choose which of the components within the pool will be incorporated into the custom installation package.

16. The software system of claim 13, wherein said options manager provides access to server-side databases in response to a user's request for information relating to specific components, said databases providing the requested information.

17. The software system of claim 13, which further comprises a discovery agent, which at the user's behest, couples directly to the client system environment and gathers information regarding the client environment for use by the options manager in presenting selection choices to the user during the dialog.

18. The software system of claim 13, which further comprises a compression process accessible by the packager which compresses at least a portion of the custom installation package prior to its transmittal to the client system.

19. The software system of claim 18, which further comprises an extractor process, said extractor process appending a self-executing extraction utility to the custom installation package which has undergone at least partial compression.

20. The software system of claim 13, wherein said means for transmitting includes a telecommunications link between the client system and the server system, over which said custom installation package is sent as a single executable file.

21. The software system of claim 13, wherein said means for transmitting includes a telecommunications link between the client system and the server system, over which said custom installation package is sent as a plurality of packets using a package transport protocol.

* * * * *